INVENTORS
ALFRED DARGIE MARTIN
JOHN DAWSON
BY Paul M. Craig, Jr.
ATTORNEY

INVENTORS
ALFRED DARGIE MARTIN
JOHN DAWSON
BY Paul M. Craig, Jr.
ATTORNEY 3,161,732
Patented Dec. 15, 1964

3,161,732

TESTING AND CONTROL SYSTEM FOR SUPERVISORY CIRCUITS IN ELECTRONIC TELEPHONE EXCHANGES

Alfred Dargie Martin and John Dawson, both of Beeston, Nottingham, England, assignors to Ericsson Telephones Limited, London, England, a British company Filed Mar. 8, 1962, Ser. No. 178,317
5 Claims. (Cl. 179—175.2)

Figure 1:
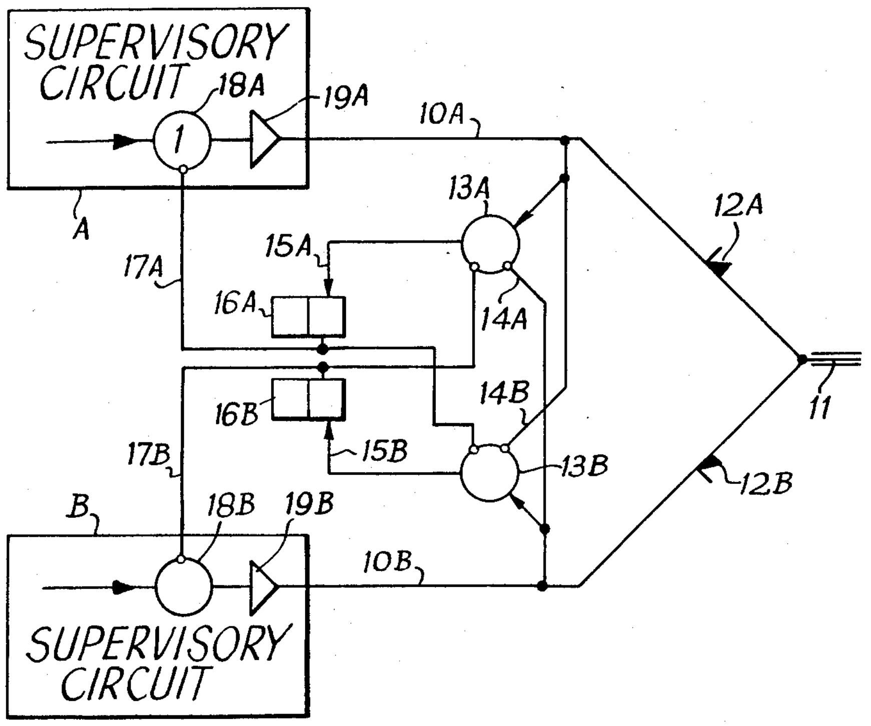

The present invention relates to electronic telephone exchanges and is concerned with the circuits, hereinafter called supervisory circuits, which control such functions as the setting up, metering and termination of calls and which operate with pulse-coded information in time-division multiplex. Each item of information takes the form of a recurrent succession of binary digits, binary 1's and 0's being represented by the presence and absence, respectively, or alternatively the absence and presence, respectively, of pulses.

Failures in the supervisory circuits are sure to occur from time to time and will produce two basic types of fault, namely the absence of a pulse or pulses which should be present, or the presence of a spurious pulse or pulses when one should not be present. In one type of supervisory circuit wherein items of information are stored in recirculating delay devices and controlled mainly by "or" gates and "and" gates it is found that a faulty "or" gate usually causes a pulse to be lost while a faulty "and" gate will ordinarily introduce a spurious pulse.

If a fault develops, it is essential that it shall not lead to the loss of more than a few calls at the most or to a gross error in metering, for example. Ensuring this requirement necessitates the use of duplicate supervisory circuits which normally operate in parallel. Outputs may or may not be taken from both circuits in parallel. When a fault develops outputs must be taken from the "good" circuit only.

This invention provides novel electronic telephone exchange apparatus comprising two duplicate supervisory circuits together with means for comparing an output signal from one circuit with the corresponding signal from the other circuit to detect any occasion on which a pulse appears in one output but not the other. On such an occasion the said means cause output signals to be supplied to other parts of the exchange apparatus from one of the supervisory circuits only. Automatic testing means then feed a sequence of test signals to the supervisory circuits in succession following such an occasion and detect any departures in the resulting output signals from the known correct output signals which should result from such test signals. If such a departure is detected in testing the said one circuit supplying output signals to other parts of the exchange apparatus, that one supervisory circuit is replaced by the other supervisory circuit.

It will be convenient to call the supervisory circuit supplying output signals to other parts of the exchange apparatus the operative circuit and to call a pulse which appears in the output of one circuit only an excess pulse. These terms are used with these meanings in the appended claims. An excess pulse either is itself a spurious pulse or indicates the absence of a pulse in the output of the other circuit.

The manner in which the said one circuit is selected will depend upon the characteristics of the exchange. In certain exchange systems to which the invention is applicable it is known that spurious pulses are much more likely to cause loss of correct information than are missing pulses which normally merely delay the performance of some function until made available again. Given such a system, the operative circuit is always initially made that one which did not produce the excess pulse.

Figure 2:
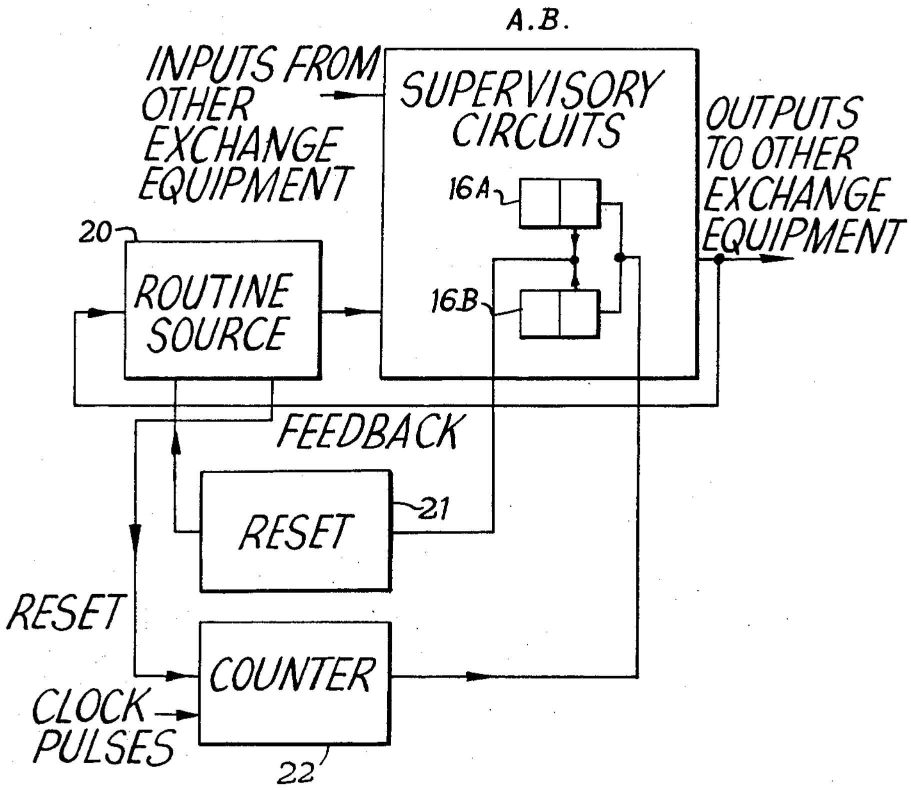

The invention will now be described in greater detail with reference to the accompanying drawings in which:

FIGURE 1 is a diagram of the output connections of two supervisory circuits A and B and FIG. 2 is a block diagram showing how test signals are fed through a supervisory circuit.

FIG. 1 shows supervisory circuits A and B which receive like inputs from other parts of the exchange apparatus and which operate in parallel. Each supervisory circuit may be of the form described in the proceedings of the AIEE, Volume 107, Part B, Supplement 20, 1960, at page 228, in an article entitled "Supervisory Equipment for a T.D.M. Electronic Telephone Exchange," by A. D. Martin. One output conductor 10A, 10B from each circuit is shown, these conductors carry signals which are to be fed to other parts of the exchange apparatus over a coaxial cable 11. The relationship of the supervisory circuit to the remainder of the telephone exchange is described in the above-mentioned publication of the AIEE at page 88 in an article entitled "System Operation of a T.D.M. Switched Highways Electronic Telephone Exchange," by R. G. Knight et al. It is possible but not preferred, normally to take outputs from circuit A only, leaving circuit B as a spare which is switched in in place of A whenever A produces an excess pulse. It is preferred to avoid the use of the switches necessary to do this, for the reason that it has been found that less information is usually lost on the occurrence of a fault with the arrangement to be described.

In this both circuits A and B feed into the cable 11 in parallel through an "or" gate formed by diodes 12A and 12B. When an excess pulse occurs it therefore passes into cable 11. This could be avoided in theory by using an "and" gate instead of the "or" gate but in practice a satisfactory "and" gate cannot be produced conveniently which will handle pulses of say megacycle repetition frequency and feed into a coaxial cable which is necessarily of low impedance.

The actual construction of the supervisory circuits forms no part of the present invention and any known supervisory arrangement can be used other than the one specifically set forth in the above-mentioned publications.

A circuit for comparing the outputs in the conductors 10A and 10B comprises two "inhibit" gates 13A and 13B. Pulses in conductors 10A are normally prevented from passing through gate 13A by the corresponding pulses in conductor 10B applied to inhibit the gate 13A at an inhibitory input 14A. Likewise pulses in conductors 10B are normally prevented from passing through gate 13B. Gates performing these functions are well known. When circuit A, for example, produces an excess pulse, the pulse passes through gate 13A since there is no corresponding pulse in conductor 10B to apply an inhibiting input to gate 13A.

The outputs 15A and 15B from the gates 13A and 13B are connected to bistable circuits 16A and 16B respectively of conventional form. An excess pulse from circuit A switches bistable 16A from its normal or "true" state to its alternative or "false" state and an excess pulse from circuit B switches bistable 16B from its normal or "true" state to its alternative or "false" state.

The outputs 17A and 17B from bistables 16A and 16B are applied as inhibitory inputs to two "inhibit" gates 18A and 18B of similar construction to gates 13A and 13B and inserted in the circuits A and B before the output amplifying stages 19A and 19B feeding the conductors 10A and 10B respectively. In the normal state neither bistable provides an inhibiting output but when either is set to its alternative state the corresponding gate 18A or 18B is inhibited. When therefore the circuit A, for example, produces an excess pulse, bistable 16A is switched, gate 18A is inhibited and signals are prevented from appearing on conductor 10A.

In the absence of any further precautions this would allow the next pulse in conductor 10B pass through the gate 13B to the bistable 16B. However, the gate 13B receives an inhibiting input from the bistable 16A, when this bistable is set. Likewise gate 13A receives an inhibiting input from bistable 16B when this bistable is set.

The supervisory circuits A and B have associated therewith a source 20 of routine test signals. This is in continuous use occupying one of the T.D.M. time slots as an additional safeguard over and above that provided by the circuit already described, one reason for this being that a fault developing in the circuit 20 itself will be shown up by this procedure.

The routine source produces a sequence of test signals which are so designed in accordance with the known nature of the common supervisory circuits that when a fault is detected with any particular test signal, that test signal gives at least some indication as to where the fault is likely to lie. The source 20 can comprise a separate input for applying each test signal and one or more cascaded multi-electrode tube of the type sold under our registered trade mark "Dekatron" and described in U.S. Patent No. 2,651,004. By pulsing the "Dekatron" tube the inputs provided thereby can be selected in turn, the order being arranged so that the test signals occur in order of decreasing importance, that is, the first test signal will detect the most important fault and so on.

The routine source 20 also includes gates which are opened by the "Dekatron" and are thus adapted to determine whether the output fed back from the supervisory circuit is correct or not. If it is correct, the output passes through the gate the "Dekatron" tube which is thus pulsed on and the next test signal is applied. If not, the sequence is halted and an alarm given by the counter circuit 22.

This brief description of one routine source will enable one skilled in the art to perform this invention since the use of routine test signals and automatic detection of incorrect responses is well known. The particular form of the routine source forms no part of the present invention. Also, for example, a store of predetermined test signals could be used from which the test signals can be fed to the circuit to be tested in sequence. This store can be a wired store with separate networks for generating successive test signals. The signals could also be stored on a magnetic drum or magnetic tape for example.

The supervisory circuits accept these signals as ordinary inputs and produce appropriate outputs which can readily be checked for correctness by a comparison technique.

Referring again to the figure, when either of the bistables 16A and 16B is set, a signal is applied to a reset circuit 21 which may be an ordinary flip-flop and which immediately resets the "Dekatron" tube in the source 20, bringing the source back to the beginning of the test sequence. The test signals, beginning with the most important, are then fed in sequence to the supervisory circuits, outputs being fed back from the operative circuit. (The other circuit in fact produces no outputs because of the inhibition of its gate 18A or B as the case may be.) An incorrect response can be detected by the fact that the "Dekatron" tube does not step on within a predetermined interval of time.

This interval is determined by a counter 22 fed with clock pulses. The counter can be any suitable pulse counter, for example, an ordinary binary counter. The counter is reset each time the "Dekatron" tube steps on and therefore the counter does not fill. When the counter fills because it is not reset and clock pulses continue to be applied to it, it indicates failure to step on and an output applied to the bistables 16A and 16B resets whichever was set and sets the other, each bistable being of the well-known type which has a single input and changes state every time this input is pulsed. If therefore circuit A is operative and a fault is detected in circuit A, circuit A is rendered inoperative and circuit B is rendered operative.

Whichever circuit is eventulally the operative circuit is tested continuously by the routine source 20 to detect a fault developing therein before the other circuit is brought back into service.

We claim:

1. A testing and control circuit for electronic telephone exchange apparatus including two duplicate supervisory circuits and comprising, means for simultaneously comparing the output signal from one supervisory circuit with the signal from the other supervisory circuit including means for detecting a state of non-correspondence between said output signals and for producing a control signal in response thereto, means responsive to said control signal for inhibiting the output of one of said supervisory circuits so as to cause output signals to be supplied to other parts of the exchange apparatus from the other supervisory circuit only, testing means responsive to said control signal for feeding a sequence of test signals automatically to the supervisory circuits in succession following detection of said state of non-correspondence, means for detecting departures in the resulting output signals of said supervisory circuits from the known correct output signals which should result from such test signals, and means responsive to said means for detecting departures in said resulting output signals for replacing the said one supervisory circuit supplying output signals to other parts of the exchange apparatus by the other supervisory circuit if a departure is detected in testing the said one circuit.

2. Apparatus according to claim 1, wherein both supervisory circuits normally work in parallel and further comprising an "OR" gate connected to the output of each of said supervisory circuits by means of which the signals from the two circuits are combined and fed to the other parts of the exchange apparatus.

3. A testing and control circuit for electronic telephone exchange apparatus including two duplicate supervisory circuits and comprising means for comparing an output signal from one supervisory circuit with the corresponding signal from the other supervisory circuit including means for detecting an excess pulse in the output of one of said circuits means responsive to the detection of said excess pulse inhibit said one supervisory circuit so as to cause output signals to be supplied to other parts of the exchange apparatus from the other supervisory circuit only, testing means for feeding a sequence of test signals automatically to said other circuit, means for detecting a departure in the resulting output signals of said other circuit from the known correct output signals which should result from such test signals, and means responsive to the detection of such a departure for replacing the said other supervisory circuit supplying output signals to other parts of the exchange apparatus by the said one circuit which produced the excess pulse.

4. Apparatus according to claim 3, and further including two bistable circuits and an arrangement of gates through which the outputs of the two supervisory circuits are applied to said bistable circuits, said arrangement being such that one bistable circuit is set when one supervisory circuit produces an excess pulse while the other bistable circuit is set when the other supervisory circuit produces an excess pulse, the bistable circuits, when set, preventing pulses from being fed to the other exchange apparatus from their respective supervisory circuits.

5. Apparatus according to claim 4, further including a source of routine test signals and means responsive to the setting of either bistable circuit to reset the source of routine test signals to the beginning of its test sequence whereby the sequence of test signals are thereafter applied to the operative supervisory circuit, a feedback connection from the output of which to the test source enabling a fault to be detected, and means for resetting the set bistable circuit and setting the other bistable circuit upon detection of such a fault.

References Cited by the Examiner

UNITED STATES PATENTS 3,060,273 10/62 Nowak et al. -------- 179—175.2

ROBERT H. ROSE, *Primary Examiner.*

WALTER L. LYNDE, *Examiner.*